3,338,475
DISPENSER FOR LIQUIDS AND CREAMS
Per Torsten Englesson, Danderyd, Sweden, assignor to
Berthen AG, Basel, Switzerland
Filed Oct. 5, 1965, Ser. No. 493,272
Claims priority, application Sweden, Oct. 9, 1964,
12,185/64
5 Claims. (Cl. 222—107)

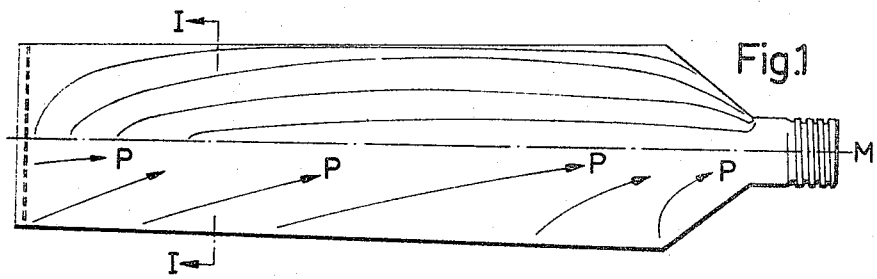
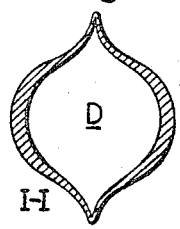
Fig.3
Fig.4
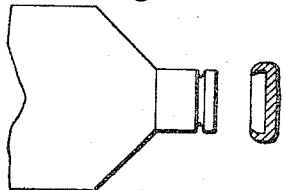
Fig.2
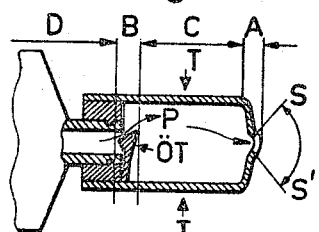
Fig.5
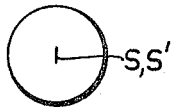
Fig.6
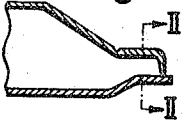
Fig.7
Fig.8
Fig.9
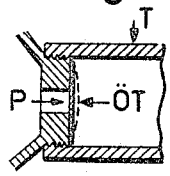
Fig.10
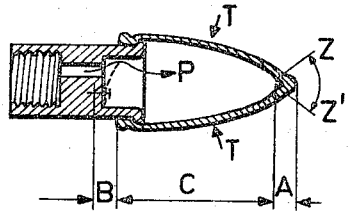
Fig.11
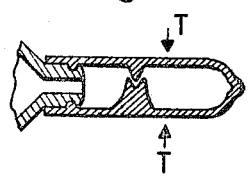
Fig.12
Fig.13 ically, the invention relates to a dispenser for
United States Patent Office 3,338,475
Patented Aug. 29, 1967

The present invention relates to a dispenser for liquids, creams and other non-solid products.

Several dispensers are known which, however, have various drawbacks such as dropping, dispensing already at slight pressure, insufficient sealing against the surrounding air, position dependent operation, etc. The best known type is the tube with screw cap which has the drawback to be inconvenient with the effect that the cap must be screwed off and on every time a portion has to be dispensed. If one neglects to screw the cap on to the tube, the latter remains open so that its content becomes dry, which is very inconvenient for further dispensing. If the tube is to be completely emptied it must be squeezed very carefully from the sealed end, which is most inconvenient.

The technically most advanced dispenser known hitherto is a tube with a separate, self-closing screw cap, the container part of the tube having essentially a conventional shape. The special tube cap is screwed on to the tube neck, said cap comprising inter alia a cone of plastic material supported by braces which allow the passage of the tube contents to the cone. A rubber membrane in the shape of a hood constitutes a pressure relief valve which provides a tight sealing around the cone. The tip of the hood must be cut off before the dispenser is used for the first time in order to allow the contents of the tube to be pressed out by squeezing the tube in the usual way, which causes the hood to expand around the cone thus giving passage to the tube contents. After the membrane has been cut off, every pressure on the tube, even involuntary, results, however, in the discharge of the contents. This dispenser is therefore unsuitable to be carried along in the luggage on a journey for instance. Furthermore the thin membrane is entirely unprotected against mechanical damages. The self-closing action may be effected, should the membrane be damaged. With this dispenser mechanism it is nearly impossible to empty the tube entirely without taking special measures. A pressure on such a tube for squeezing out a portion of the contents must, as a matter of fact, be performed in such a way and with such a power that a pressure arises inside the whole tube, which pressure is required to overcome the closing power of the membrane. This condition leads to an inconvenience which increases the more as the tube becomes empty and finally the tube must be squeezed in totality and with an increasing power to cause a discharge of the contents.

The purpose of the invention is to provide a dispenser which eliminates or at least considerably reduces these drawbacks.

The invention is based upon the fact that the simplest way to eliminate all the drawbacks which arise when it is necessary to squeeze the tube in order to discharge a certain quantity of its contents is, instead, to suck out the contents from the tube and to arrange the tube so that it can be practically fully exhausted without it moreover being necessary to squeeze the tube. The suction part is preferably arranged as a dosing device in order to provide an accurate or approximate control of the quantity of the tube contents discharged. The dosing device can also be arranged so as to constitute a part of a tube which, in that case, is made of plastic, resilient material either in form of a direct prolongation of the cross section of the tube or as an extension of its end.

Accordingly, the invention relates to a dispenser for liquids, creams and other non-solid substances, comprising a container part and a dosing device, wherein the dosing device mainly consists, in part of a discharge opening operating as a pressure relief valve which opens only after a certain pressure has been reached and in one direction only, in part of a check valve arranged between the container part and the discharge opening, its throughflow direction extending from the container part towards the discharge opening and, in part of a zone, compressible for discharge and elastically returning to its initial position, arranged between the check valve and the pressure relief valve, in which zone the elastic returning movement creates a depression which sucks the liquid, the cream or the like out of the container part through the check valve into the above-mentioned zone.

According to a further development of the invention, the container part has a wall thickness which decreases from the opening and from the middle towards the container end and the edge parts, a feature which renders possible a nearly complete emptying of the container part in the direction of the dosing device owing to the suction effect resulting from the elastic return of the zone, the container part being progressively exhausted to a flat state starting from the container end and the edge parts.

Particular embodiments and closer details of the invention are disclosed in the following description reference being made to the attached drawing in which the various schematic figures represent the following:

FIG. 1, a particular embodiment of the container part according to the invention, showing the increase of the wall thickness and the discharging direction of the content being indicated, FIG. 2, an alternative embodiment of the container part for a snap cap, FIG. 3 and FIG. 4, a vertical section I—I through the container part according to FIG. 1 at different emptying stages, FIG. 5, an embodiment of the dosing device, FIG. 6, a front view of a device according to FIG. 5, FIG. 7, a pressure relief valve, FIG. 8, a vertical section II—II through the front part of the device according to FIG. 7, FIG. 9, a front view of a check valve with a strip as valve member, FIG. 10, a sectional side view of the device according to FIG. 9 directly mounted on the container part, FIG. 11, a dosing device in two pieces, FIG. 12, a dosing device with a non-automatic closing check valve, FIG. 13, a section through a non-automatic closing check valve.

As previously mentioned the progressive emptying of the container part does not occur in a conventional way by exerting a certain pressure on the container part. According to the invention the container part is instead emptied by suction. The suction effect is created by the elastic return of the zone C in its initial position after having been squeezed. The content of the container part is thus sucked into the dosing device from which it is discharged due to the overpressure created when the zone C is squeezed.

The dosing device consists, as mentioned above and shown on the drawing in FIG. 5, in principle of a pressure relief valve A which also constitutes the discharge opening, a check valve B and a compressible, resilient zone C therebetween. The device operates as follows: A squeezing of the zone C (arrows T) for instance between the thumb and the forefinger, creates an overpressure ÖT in the dosing device. Consequently, the check valve B closes, the pressure relief valve A opens and discharge occurs. According to the invention, the pressure relief valve A is, however, dimensioned so that the pressure required in the zone C for opening the pressure relief valve is higher than the pressure which can reasonably arise in the container part under normal manipulation. This implies that the pressure relief valve does not open when the container part is subjected to a conventional presesure. Any involuntary emptying is thus prevented. The dispenser according to the invention can be carried along without any risks in hand luggage, handbags etc. and even in trouser's pockets.

A discharge occurs when the pressure resulting form the squeezing of the zone C is higher than the opening pressure of the pressure relief valve. The discharge causes a pressure drop if the squeezing is not carried on with unchanged power. As soon as the pressure in the zone C drops below the opening pressure, the discharge opening closes distinctly so that the discharge is cut off and no after-dropping occurs.

Owing to the construction of the valve A no air can penetrate into the valve from outside and therefore an underpressure arises in the zone C. Consequently, the check valve B opens and a new dose of cream, paste, liquid or the like is sucked from the container part into the dosing device B until the zone C has again been filled and the underpressure compensated for. This suction effect is always exerted as long as a certain surrounding atmospheric pressure prevails i.e. even in aircraft without pressurized cabin flowing at high altitude or the like. The operation of the dispenser according to the invention does not depend on gravity and is therefore entirely independent of its position so that even astronauts, for instance, may use the dispenser according to the invention during space travels provided a certain pressure prevails inside the space craft.

The pressure relief valve A of the dosing device can be arranged in a manner known per se and this is also true for the check valve B. FIGURES 5-13 show some possible construction but by far not all of them.

A particularly suitable embodiment of the pressure relief valve and of the discharge opening has proved to be that in which the pressure relief valve, made of rubber or soft plastic for instance, is provided with an internal recess in the area of the discharge opening, said recess possibly corresponding to an external wartlike zone Z–Z' (FIGURE 11) in which a cut S–S' (FIGURES 5–6) has been made which constitutes the discharge opening proper. By using more or less extensible rubber compounds it is possible to decrease or increase the opening overpressure, which can also be achieved by providing a longer or shorter cut when using the same rubber compound. A third method in this connection consists in providing a smaller or larger wall thickness in and around the zone Z–Z'. Among the check valves which have been treated in this connection, different varieties of ball valves and disc valves have, among others, provided a satisfactory operation.

In FIGURES 9 and 10 it is proposed to arrange the check valve and the container part in one piece. In an embodiment according to these two figures the check valve function is performed by a strip of suitable material and thickness directly arranged in front of the container opening. On the other hand, the pressure relief valve and the container part can also be constituted by a one-piece unit into which the check valve is thereafter inserted, screwed in place or secured in any other suitable manner. Besides, the container part can also be made in one piece with the check valve and the pressure relief valve.

According to another particular embodiment of the invention shown in FIGURES 12 and 13 a non-automatically closing check valve is used, namely, a check valve which is mechanically closed when the zone C is squeezed. When said zone C is deformed under squeezing, a suitably shaped valve element is brought to abut a valve seat such as to prevent back flow of the substance to be discharged. When the squeezing pressure is released and the zone C returns in its initial position due to its elasticity, said check valve opens again and a new dose of substance is sucked into the zone C.

As already mentioned, the container part is not emptied by conventional squeezing of said container part but by suction by means of the dosing device. FIG. 1 shows an embodiment of the container part which is particularly well suited for exhaustion according to the invention, the lines in the upper half of the figure joining points of the same wall thickness. As it appears from this part of the figure, the wall thickness decreases from the opening and from the chain-dotted center line M towards the end and the edge parts of the container. This decreasing wall thickness is also shown in FIGURES 3 and 4. The wall thickness formed in such a way results in that when the container part, as proposed according to the invention, is emptied by suction by means of the dosing device, the walls of the container part are sucked together starting from the container end and the edge parts so that there always exists a "suction contact" between the check valve and the remaining content in the container part.

The lower half of FIG. 1 further shows the direction in which the contents move towards the opening when the container part is, in principle, arranged according to this embodiment of the invention. This direction of movement is in that case not subjected to any major variations but follows mainly the direction of the arrows P independently of the emptying gradient. This is not the case when the tube with an even peripheral wall thickness is used for instance.

The container part according to this particular embodiment is shown in FIGURES 3 and 4 with different contents amounts. As it further appears from these figures the container part can be constituted by two halves welded to each other or it may be made in one piece and provided with folding notches along the edges so as to become entirely flat when exhausted.

The container part shown in FIG. 1 is provided with a threaded tube neck. Instead of a threading the neck can, in a manner known per se, be provided with a groove according to FIG. 2 on which also a conventional snap cap has been indicated, which can be used for a so-called refill-container for instance. The purchaser replaces the snap cap with the dosing device from an empty container which, in that case, must of course also be provided with a corresponding groove (for instance FIG. 5, FIG. 12).

The detailed arrangement of the invention is not limited to the embodiments shown on the drawing by way of examples but are mainly determined by manufacturing and cost factors. The dosing device according to the invention can, of course, be used together with conventional, hitherto known tubes and other containers and can also be undetachably connected to said container.

The squeezing action exerted on the zone C can, besides by hand, also be exerted in a different manner, for instance by means of a foot operated mechanical device which, for instance in hospitals, considerably reduces the danger of infection.

Since a squeezing action with the same "stroke" on the zone C always causes the discharge of the same quantity as long as any content remains in the container part, the dosing device according to the invention is also suitable to be used in connection with automatic dispensers. In that case the squeezing action on the zone C is preferably brought about by mechanical means and combined with a locking device, which is released for pressure by inserting a coin of a determined value through a slot and again locked after the squeezing has been carried out.

What I claim is:

1. A dispenser for liquids, creams and other non-solid substances comprising an at least partially resilient, closed container part and a dosing device connected to said container part, the dosing device being arranged to empty in portions the container part by suction the dosing device including a discharge opening (A) operating as a pressure relief valve which opens only after a predetermined pressure has been reached, a check valve (B) arranged between the container part (D) and the discharge opening (A), the flow direction through said valve (B) extending from the container part (D) towards the discharge opening (A), and a wall zone (C), compressible for discharge and elastically returnable in its initial position, arranged between the check valve (B) and the pressure relief valve (A), elastic return of the wall zone after compression creates a suction for pulling the contents of the container part (D) through the check valve (B) into the wall zone (C) (FIGURE 5), characterized in that the container part (D) is provided with a wall having a thickness decreasing from an open end and middle of the container towards edge parts and closed end of the container (FIGURES 1, 3 and 4) allowing nearly complete emptying container part (D) in direction of the arrows (FIGURE 1) towards the dosing device due to the suction effect created by the return movement of the wall zone (C) as well as the progressive flattening of the container part (D) starting from the container closed end and the edge part.

2. A dispenser according to claim 1 characterized in that the container part (D) and the check valve (B) are made in one piece (FIGURE 10).

3. A dispenser according to claim 1 characterized in that the container part (D) and the check valve seat are made in one piece (FIGURE 10).

4. A dispenser according to claim 1 characterized in that the pressure relief valve is provided with an internal recess in the area of the discharge opening (A), said recess corresponding to an external wart-like area (Z–Z') (FIGURE 11) where a cut (S–S') (FIGURES 5, 6) has been provided which constitutes the discharge opening proper.

5. A dispenser according to claim 1 characterized in that the pressure relief valve is provided with a resilient, biased member which closes and opens the discharge opening, the biasing force being greater than the force normally exerted on the wall zone (C) but that the bias is reduced by a squeezing action on a marked place on the wall zone (C) so that the over pressure created in the wall zone (C) for the discharge opens the pressure relief valve (FIGURES 7, 8).

References Cited
UNITED STATES PATENTS

| | | | |
|---|---|---|---|
| 1,844,215 | 2/1932 | Edwards | 222—92 |
| 2,143,661 | 1/1939 | Schrader | 222—207 |
| 2,219,604 | 10/1940 | Trotter | 222—207 |
| 2,778,534 | 1/1957 | Ramsey | 222—129.4 |
| 2,802,604 | 8/1957 | Ebberts | 222—207 |
| 2,939,615 | 6/1960 | Lerner | 222—207 |
| 3,220,611 | 11/1965 | Zander et al. | 222—207 |

FOREIGN PATENTS

| | | |
|---|---|---|
| 89,633 | 8/1960 | Denmark. |
| 902,736 | 8/1962 | Great Britain. |

ROBERT B. REEVES, *Primary Examiner.*

HADD S. LANE, *Examiner.*